US010943205B2

(12) United States Patent
Edens et al.

(10) Patent No.: US 10,943,205 B2
(45) Date of Patent: Mar. 9, 2021

(54) AUTOMATED DETECTION OF MISSING, OBSTRUCTED, OR DAMAGED LABELS

(71) Applicant: Amazon Technologies, Inc., Seattle, WA (US)

(72) Inventors: Eric Edens, Seattle, WA (US); Andrea Frank, Seattle, WA (US); Mercia Elizabeth Howard, Seattle, WA (US); Daniel Muething, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 347 days.

(21) Appl. No.: 15/197,045

(22) Filed: Jun. 29, 2016

(65) Prior Publication Data

US 2017/0357937 A1    Dec. 14, 2017

Related U.S. Application Data

(60) Provisional application No. 62/348,853, filed on Jun. 10, 2016.

(51) Int. Cl.
| | | |
|---|---|---|
| G06Q 10/08 | (2012.01) | |
| G06Q 50/28 | (2012.01) | |
| B07C 3/14 | (2006.01) | |
| G06K 7/10 | (2006.01) | |
| G06K 19/06 | (2006.01) | |

(52) U.S. Cl.
CPC .......... *G06Q 10/0832* (2013.01); *B07C 3/14* (2013.01); *G06K 7/10861* (2013.01); *G06K 19/06028* (2013.01); *G06K 19/06056* (2013.01); *G06Q 10/0838* (2013.01); *G06Q 50/28* (2013.01)

(58) Field of Classification Search
CPC ............... G06Q 10/0832; G06Q 50/28; G06Q 10/0838; B07C 3/14; G06K 7/10861; G06K 19/06028; G06K 19/06056
USPC .......................................................... 705/332
See application file for complete search history.

(56) References Cited

U.S. PATENT DOCUMENTS

| | | | | |
|---|---|---|---|---|
| 4,769,110 A | * | 9/1988 | Ohno ........................ | B07C 3/18 156/350 |
| 6,995,673 B1 | * | 2/2006 | Osredkar ............... | G06Q 10/08 235/384 |
| 7,050,938 B1 | | 5/2006 | Prater et al. | |

(Continued)

FOREIGN PATENT DOCUMENTS

| | | |
|---|---|---|
| JP | 2012108423 | 6/2012 |
| WO | 2013134256 | 9/2013 |

OTHER PUBLICATIONS

Mpf products; "New USPS Mailing Regulations for Lithium Battery Shipments in Mar. 2015"; Mar. 13, 2015. (Year: 2015).*

(Continued)

*Primary Examiner* — George Chen
*Assistant Examiner* — Dione N. Simpson
(74) *Attorney, Agent, or Firm* — Thomas | Horstemeyer, LLP (57) ABSTRACT

Systems and methods for generating labels are described. A label having particular format and content can be affixed to a parcel depending upon its. Barcodes can be positioned adjacent to one or more of the borders of the label. If, during a shipping workflow, one or more of the barcodes cannot be detected, it can be assumed that the label is damaged or obstructed.

11 Claims, 6 Drawing Sheets

(56) References Cited

U.S. PATENT DOCUMENTS

| | | | | |
|---|---|---|---|---|
| 7,751,929 B1* | 7/2010 | Prater | ................ | G06Q 10/087 |
| | | | | 700/227 |
| 2015/0193761 A1* | 7/2015 | Svetal | ................ | G07G 1/0036 |
| | | | | 705/23 |
| 2015/0278758 A1* | 10/2015 | Kim | ................ | G06Q 10/08355 |
| | | | | 705/338 |

OTHER PUBLICATIONS

Patent Application PCT/US2017/035573 filed on Jun. 2, 2017, International Search Report dated Aug. 3, 2017.
European Patent Application 17729333.9 filed on Jun. 2, 2017, Office Action dated Jan. 25, 2019.
EP Application No. 17729333.9, Office Action dated Nov. 8, 2019.

* cited by examiner

AUTOMATED DETECTION OF MISSING, OBSTRUCTED, OR DAMAGED LABELS

CROSS-REFERENCE TO RELATED APPLICATION

This application claims the benefit of U.S. Provisional Application No. 62/348,853, filed Jun. 10, 2016 and entitled "Automated Detection of Missing, Obstructed or Damaged Labels," which is hereby incorporated herein in its entirety.

BACKGROUND

Packages shipped from a fulfillment center, warehouse, or the like can sometimes contains hazardous or regulated materials. Regulatory requirements might require that warning or disclosure labels identifying materials contained within a shipment and providing handling and emergency response instructions be affixed to a box or envelope in which a shipment is packaged. These requirements might also require that these labels be unobstructed and undamaged or placed only in certain positions. Additionally, a shipper might desire for other types of labels, such as shipping labels, to be unobstructed or undamaged to ensure that the labels are visible to carriers and recipients of a parcel.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure are directed to automated detection of labels on a box, envelope, or other parcel. More specifically, the presence of, obstruction of, misplacement of, or damage to labels, such as regulatory labels, can be detected. Labels warning workers, carriers, or recipients of a parcel about the presence of hazardous or regulated materials can improve worker safety and public safety. These labels can educate and instruct workers, carriers and recipients of a parcel about how to safely handle the parcel, or indicate that the parcel should be restricted to certain modes of transportation.

Various laws and regulations in different jurisdictions might also require that certain labels be placed on shipments to alert carriers and recipients to the presence of hazardous or regulated materials in the shipment. For example, United States federal regulations currently require that a warning label be placed on certain shipments that include a lithium ion or lithium metal battery. Additionally, these regulations can prescribe the precise content, positioning and size of the label. Regulations also specify that the label cannot be damaged, marked, or even partially obstructed. Violations of these regulations can result in significant penalties to an entity shipping the parcel. Accordingly, embodiments of the disclosure can perform automated detection of such a label and also detect whether the label is potentially blocked, damaged, misplaced or occluded by some obstruction in violation of these regulations.

In a fulfillment center in which many packages are handled and from which many packages are shipped, manual inspection of every label on outgoing shipments can be a time-consuming, tedious, and error prone process. Accordingly, embodiments of the disclosure can facilitate automated inspection of labels that are required to be affixed to certain packages being shipped from the fulfillment center. If no label can be detected or if a label has been damaged, improperly affixed or blocked by another label, the package can be flagged or sidelined, where further inspection of the package can be conducted.

Figure 1:
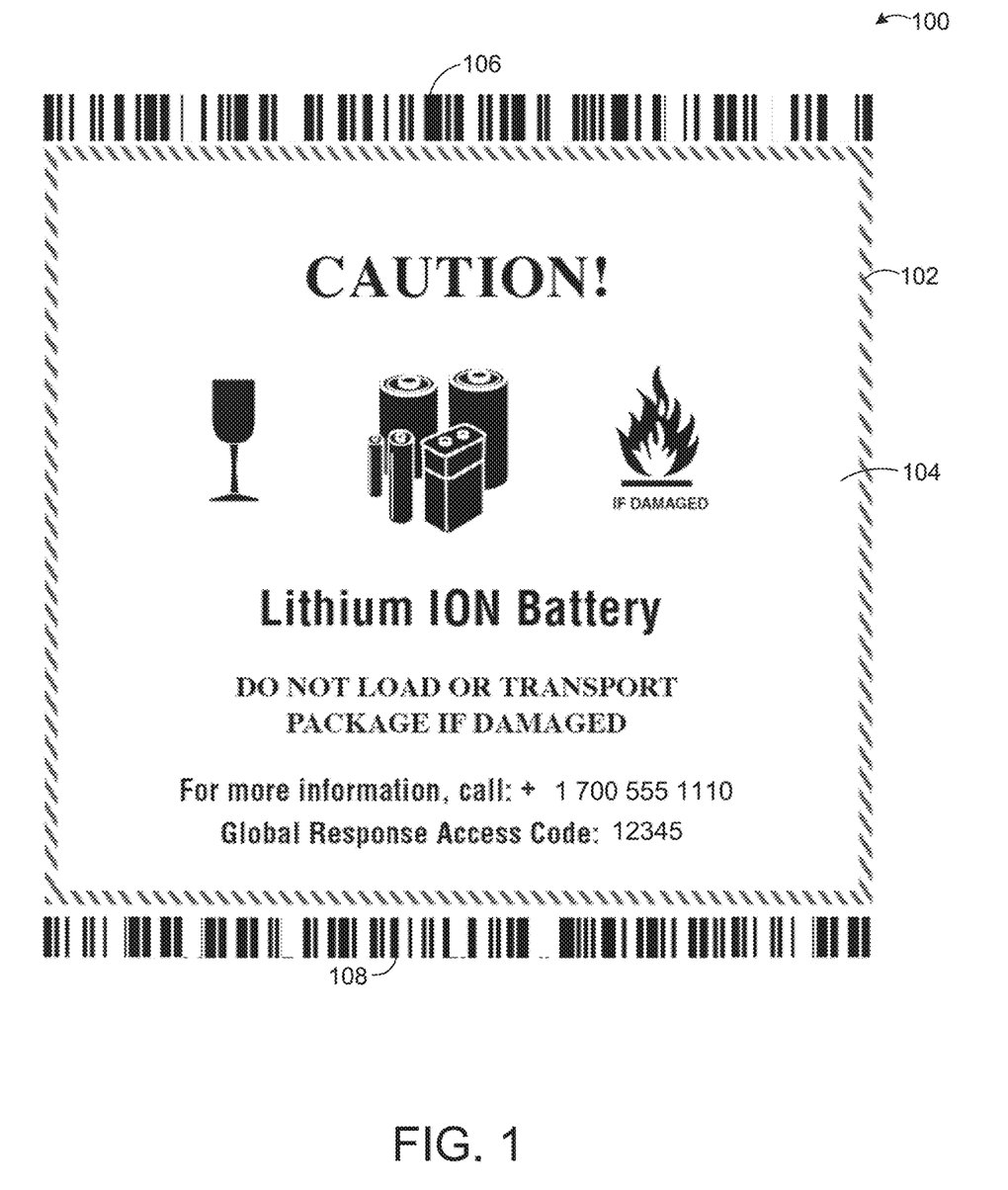
FIG. 1 is a drawing of an example label according to embodiments of the disclosure.

Reference is now made to FIG. 1, which illustrates an example of a label 100 that is generated according to embodiments of the disclosure. The label 100 can include label content, which can include a barrier 102 or border and informational content 104 within the barrier 102. In some examples, the label content of a label 100 might only include informational content 104 without any barrier 102 or visible border. In the example of FIG. 1, the barrier 102 is a hashed line barrier. In some embodiments, the barrier 102 is required by regulations to be a certain color. Additionally, regulations can require that the barrier 102 and all of the informational content 104 within the barrier be presented in a very particular manner. In other words, the informational content 104 and the barrier 102 is required to look a certain way. In certain jurisdictions and under certain regulations, the precise look and size of the barrier 102 and informational content 104 can be prescribed by law. The barrier 102 can comprise a polygonal barrier of any number of sides. In the depicted example, the barrier 102 is rectangular, but the barrier 102 can also be a triangular barrier, a pentagonal barrier, a hexagonal barrier, etc. In some examples, the barrier 102 can comprise a circular or elliptical barrier.

According to some examples of regulations, the label 100 must be placed on certain shipments depending upon the content of a respective shipment (e.g. contents including a lithium battery or hazardous materials). According to embodiments of the disclosure, the label 100 is generated so that it includes barcodes 106 and 108 that are positioned along respective borders of the hashed line barrier 102 but without obstructing the barrier 102 or informational content 104. In one example, the barcodes 106 and 108 can be encoded with a different numeric or alphanumeric value so that they can be individually identified or distinguished from one another. In some examples, the barcodes 106 and 108 can also vary in size. The barcodes 106 and 108 can be generated from alphanumeric or numeric data of sufficient size such that the barcodes 106 and 108 meet a size threshold. In other words, the barcodes 106 and 108 can be packed with enough data so that they respectively span a sufficient length along the barrier 102 of the label 100. In some embodiments, the size of the elements comprising the barcodes 106 and 108 can be adjusted (i.e., made larger or smaller) so that the barcodes 106 and 108 span the entire length of one or more sides of the barrier 102.

The barcodes 106 and 108 can be placed along respective borders of the barrier 102 within a prescribed distance or a threshold distance from the barrier 102. In one example, one or both of the barcodes 106 or 108 can span an entirety or a vast majority of a particular side of the barrier 102. In the example depicted in FIG. 1, the barcodes 106 and 108 are placed along opposing sides of the barrier 102. The label 100 can also be configured with a number of barcodes that is equal to or less than the number of sides of the barrier 102. The barcodes, in any configuration, can be positioned along respective borders of the barrier 102 without obstructing the barrier 102 or informational content 104.

In some examples, the barcodes can be placed within the informational content 104 of the label 100. In other examples, the barcodes can be placed abutting the informational content 104 of the label in cases where there is no barrier 102 associated with the label content. In another embodiment, a single side of the barrier 102 can have more than one barcode bordering the side of the barrier 102. In this way, if a portion of the barrier 102 or the informational content 104 are damaged or obstructed, the portion of the label 100 that is damaged or obstructed can be localized by determining what location of the barrier 102 corresponds to a barcode that cannot be detected by inspection of the barcodes. As will be described herein, the barcodes 106 and 108 can allow a system that incorporates barcode scanner or another form of optical scanner or sensor to determine whether the label 100, once placed on a shipment, has been damaged, obstructed, misplaced or marred.

In some scenarios, regulations might require that the label 100 be placed on a shipment with all of the label content being visible on the parcel. In some embodiments, regulations might require that the label 100 be placed on a particular side of the parcel. Regulations might also specify that the label 100 is forbidden from being placed on certain sides of the parcel. Therefore, the barcodes 106 and 108 can allow an automated system to determine whether the label 100 has in fact been placed on a shipment where required and whether the label 100 has been damaged or obstructed.

In one scenario, a label inspection station can identify a parcel, such as a box or envelope, by identifying a parcel identifier that has been placed on the parcel. The parcel identifier can be embodied in another barcode, quick response code, or other identifier on a label affixed to the parcel. The parcel identifier can be associated with an order, a shipment, or other electronic record that identifies the contents of the parcel or that identifies a particular label 100 that should be affixed to the parcel. The parcel identifier can also be associated with particular values that are to be encoded within the barcodes 106 and 108 in the label 100. In one example, the barcodes 106 and 108 can be unique with respect to other barcodes that are incorporated into other labels 100. In another example, the barcodes 106 and 108 can merely be unique with respect to one another.

The label inspection station, upon detection of the parcel identifier, can then determine whether the parcel corresponding to the parcel identifier requires a certain label 100. In various embodiments, there can be multiple types of labels 100 indicating the presence of various hazardous or regulated materials depending upon the contents of the parcel and the jurisdictions to/from which the parcel is being shipped. Additionally, in some scenarios, more than one label 100 might be required if multiple hazardous or regulated materials are incorporated within a shipment.

Accordingly, to determine whether the label 100 has been affixed to a parcel, a label inspection station can detect the presence of barcodes 106 and 108. If one or both of the barcodes 106 and 108 are missing or cannot be detected by the label inspection station, the parcel can be sidelined or flagged for further inspection. If one or both of the barcodes 106 or 108 are missing, the label inspection station can assume that the label 100 is missing, damaged or obstructed. If the barcodes 106 and 108 are successfully detected by the label inspection station, the parcel can be advanced through a shipping workflow, which might include weighing of the parcel, calculation of postage or a shipping rate, measuring the dimensions of the parcel, printing and applying a shipping label to the parcel, depositing the parcel with a carrier, or other steps of a workflow that results in the parcel being shipped.

In some embodiments, inspection of the parcel for the presence of a label can be conducted at other points in a shipping workflow. For example, the label 100 can be inspected after a parcel is weighed, after a shipping label is applied and just before the parcel is deposited with a shipping carrier. In another example, the label 100 can be integrated within a shipping label that is printed and affixed to the parcel as long as the shipping label with the integrated label 100 complies with regulations governing placement of the label.

Figure 2:
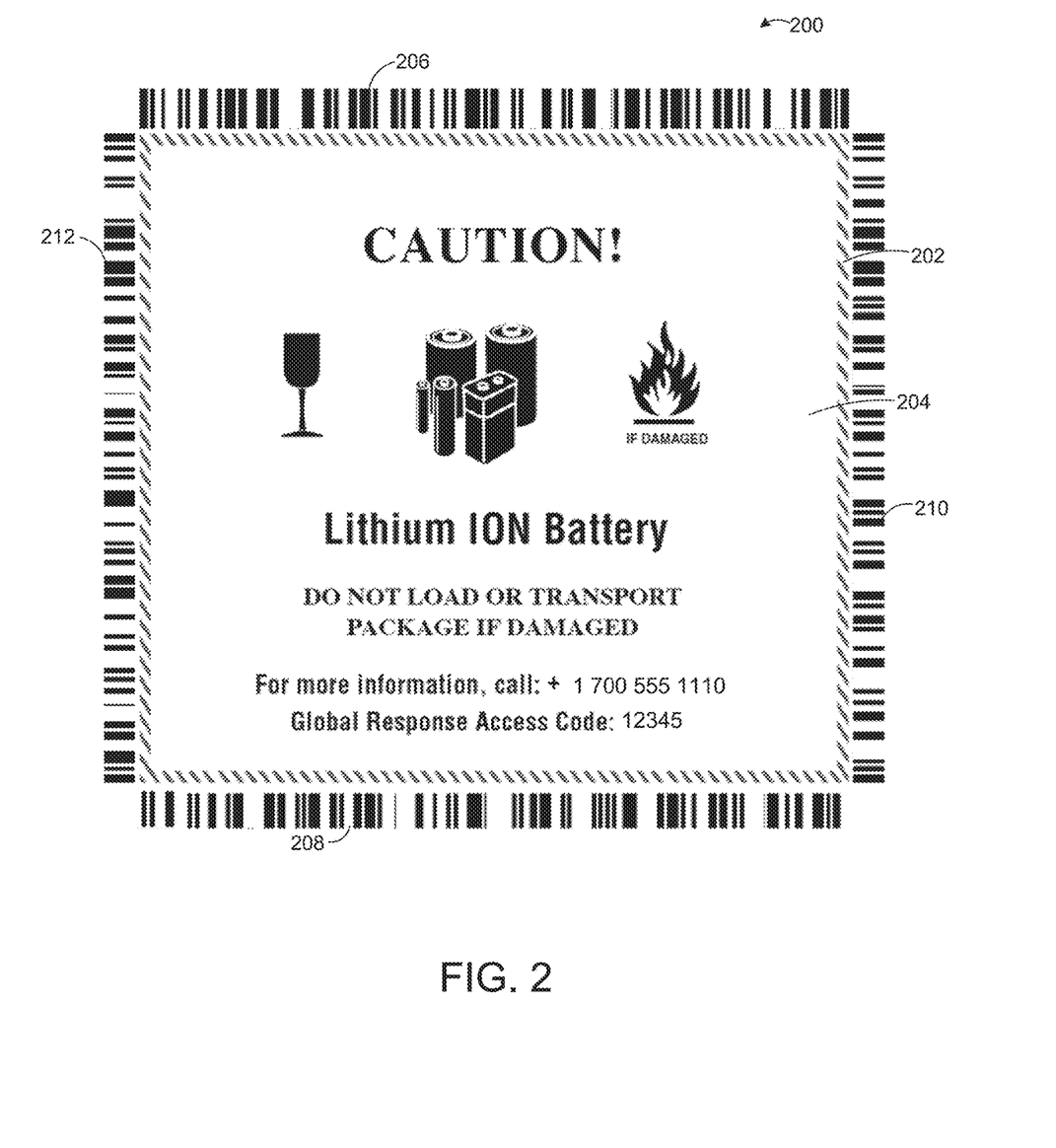
FIG. 2 is a drawing of an example label according to embodiments of the disclosure.

Referring next to FIG. 2, shown is an alternative example of a label 200 according to embodiments of this disclosure. In the example of FIG. 2, the label 200 is generated with a barrier 202 and content 204 that define the prescribed label required to be affixed to a parcel according to one or more regulations. In contrast to the example of FIG. 1, the label 200 is generated with barcodes 206, 208, 210, and 212 bordering all four sides of the barrier 202. In this way, the label inspection station can detect the presence of the four barcodes 206-212 abutting the barrier 202. In some applications, using fewer barcodes, as in the case of FIG. 1, might be preferred to reduce the size of the label 100 placed on a parcel. In other applications, using a barcode on each side of the barrier 202 might be preferred where increasing the size of the label 200 is not a concern. As described above, in additional embodiments, one or more sides of the barrier 202 can have more than one barcode bordering the side of the barrier 202.

If one or more of the barcodes 206-212 are not detected by the label inspection station, the respective parcel can be sidelined for further inspection. A barcode 206-212 might not be detected due to an obstruction, a missing label 200 where one is expected, or damage to the label 200. Additionally, a barcode 206-212 might not be detected due to the label being inadvertently or erroneously placed such that it spans more than one side of a parcel, which might violate regulatory requirements or shipping policies. In some scenarios, a label 100 or 200 can also be generated with one barcode or three barcodes bordering respective sides of the barrier 202 depending upon the application.

Figure 3:
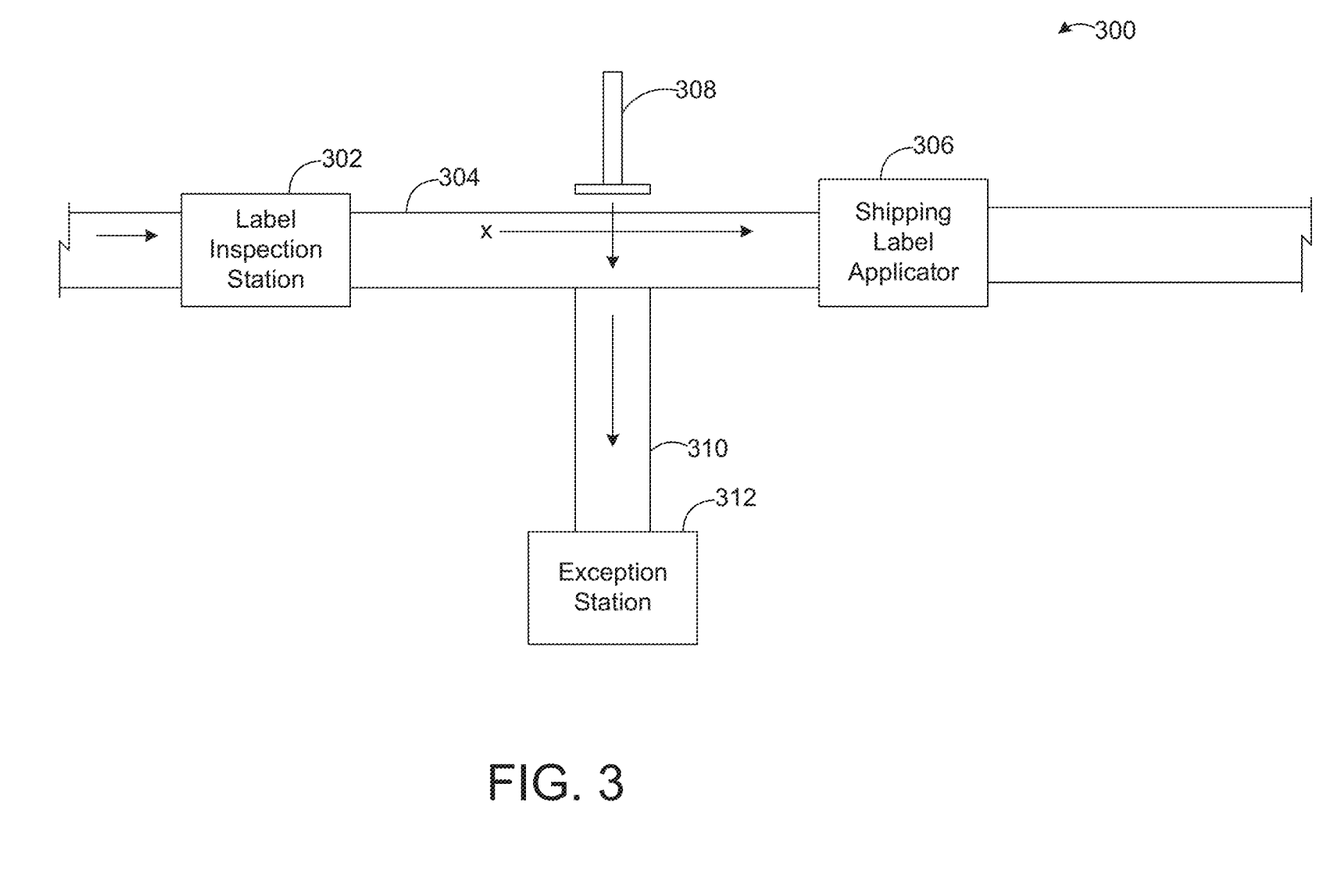
FIG. 3 is a drawing of a conveyor system incorporating a label inspection station according to embodiments of the disclosure.

Referring next to FIG. 3, shown is an example of a portion of a conveyor system 300 according to one embodiment of the disclosure. The conveyor system 300 can be deployed in a fulfillment center from which parcels are shipped. Parcels can be loaded with items in the fulfillment center. For example, when a user orders an item from an electronic marketplace, one or more shipments can be prepared with items corresponding to the user's order. Additionally, when a user orders an item from the marketplace, in some embodiments of the disclosure, a label 100 corresponding to items ordered by the user can be automatically generated at a label printing station that is placed on the conveyor system 300.

Once a box, envelope, or other form of parcel is selected for shipment, a parcel identifier that uniquely identifies the parcel with respect to other parcels in the fulfillment center can be identified or generated, and associated with the parcel and the shipment. The items associated with the shipment can be packed into the parcel. The parcel identifier can be linked to an indication in a data store that identifies whether a label 100 is required for the parcel. A fulfillment application or other software executed by one or more computing devices that can orchestrate the conveyor system 300 and/or label inspection station 302 can make a determination regarding whether a label 100 is required to be affixed to a particular parcel. The determination can be made based upon the items associated with the shipment. Metadata associated with the items can specify whether and which label 100 is required to be affixed to the parcel in which the item is shipped.

In one embodiment, once an order is placed or a shipment initiated, printing of a label 100 can be initiated if an item within the parcel requires the label 100. In some embodiments, a worker can affix a label 100 to the parcel when loading the parcel with the items. In other embodiments, an automated label printer and/or label applicator can automatically print and affix the label 100 to the parcel. The parcel can be sealed or closed and sent down the conveyor system 300 for automated inspection and affixing of a shipping label. In the example of FIG. 3, the parcel is provided to the conveyor system 300, which moves the parcel into the label inspection station 302. The label inspection station 302 can be equipped with one or more optical scanners that are configured to identify barcodes from the label 100. In one example, the label inspection station 302 can be equipped with optical scanners sufficient in number and positioned such that the top five sides of a box, other than the side (e.g., a bottom) of the box on a conveyor belt of the conveyor system 300, are examined by the label inspection station 302. In some jurisdictions, a label 100 cannot be placed on the bottom facing side of a parcel, so it is only necessary to examine the top five sides of the parcel for the presence of the label 100.

In other embodiments, the label inspection station 302 can be configured with an appropriate conveyor belt, such as a transparent conveyor belt, and additional optical scanners such that all six sides of the parcel can be examined by the label inspection station 302. In other jurisdictions, a label 100 can be placed on the bottom facing side of a parcel, so it might be necessary to examine the all six sides of the parcel for the presence of the label 100.

Once a parcel enters the label inspection station 302, the label inspection station 302 can identify the parcel identifier by identifying a barcode or other form of labeling in which the parcel identifier is embedded. The label inspection station 302, or a program orchestrating the conveyor system 300, can determine based upon the parcel identifier whether a label 100 is required to be affixed to the parcel and identify which label 100 should be affixed thereto. The label inspection station 302 can then identify the one or more barcodes that border the barrier 102 of any label 100 that is applied to the parcel. If all of the expected barcodes are detected by the label inspection station 302, the parcel is advanced by the conveyor belt 304 of the conveyor system 300 in a shipping workflow. In one embodiment, the next station in the shipping workflow can be a shipping label applicator 306 where a shipping label can be printed and robotically or manually affixed to the parcel. The shipping label applicator 306 can also initiate a transaction to acquire space from a shipping carrier for the parcel. In another embodiment, the next station in the shipping workflow can be a weighing station where the parcel is weighed. In some embodiments, a weighing station can precede the label inspection station 302. In other embodiments, the shipping label applicator 306 can also precede the label inspection station 302 so that both the shipping label and any labels are applied at the same station, or the shipping label is applied prior to any required labels. The ordering of the various stations depicted in the drawings and discussed herein is non-limiting and the various stations can be positioned in any order for various forms of a shipping workflow.

If the expected barcodes are not detected by the label inspection station 302, the label inspection station 302 can generate an exception or alert associated with the parcel. In one example, the parcel can be advanced by the conveyor system to the sidelining device 308, which redirects the parcel to a sidelining conveyor 310, which in turn moves the parcel to an exception station 312. The sidelining device 308, sidelining conveyor 310, and the exception station 312 can all be positioned downstream from the label inspection station 302 within the conveyor system 300. In some scenarios, the label inspection station 302, sidelining device 308, and exception station 312 can be integrated into a single station.

Another example of an exception generated by the label inspection station 302 can include generating an alert that is transmitted to a computing device or server that alerts a worker. In another scenario, a notification can be generated by the label inspection station 302 that is sent to a worker. An exception can also take the form of halting the conveyor system 300 when a missing, damaged, or obstructed label 100 is detected by the label inspection station 302.

The parcel can be further inspected by a worker or the label affixed and/or replaced at the exception station 312. In some embodiments, printing of the required label can be initiated at a label printer, and the label applied at the exception station 312. From the exception station 312, the parcel, once a label has been replaced or affixed, can be redirected through the label inspection station 302 once again for inspection of the label.

Figure 4:
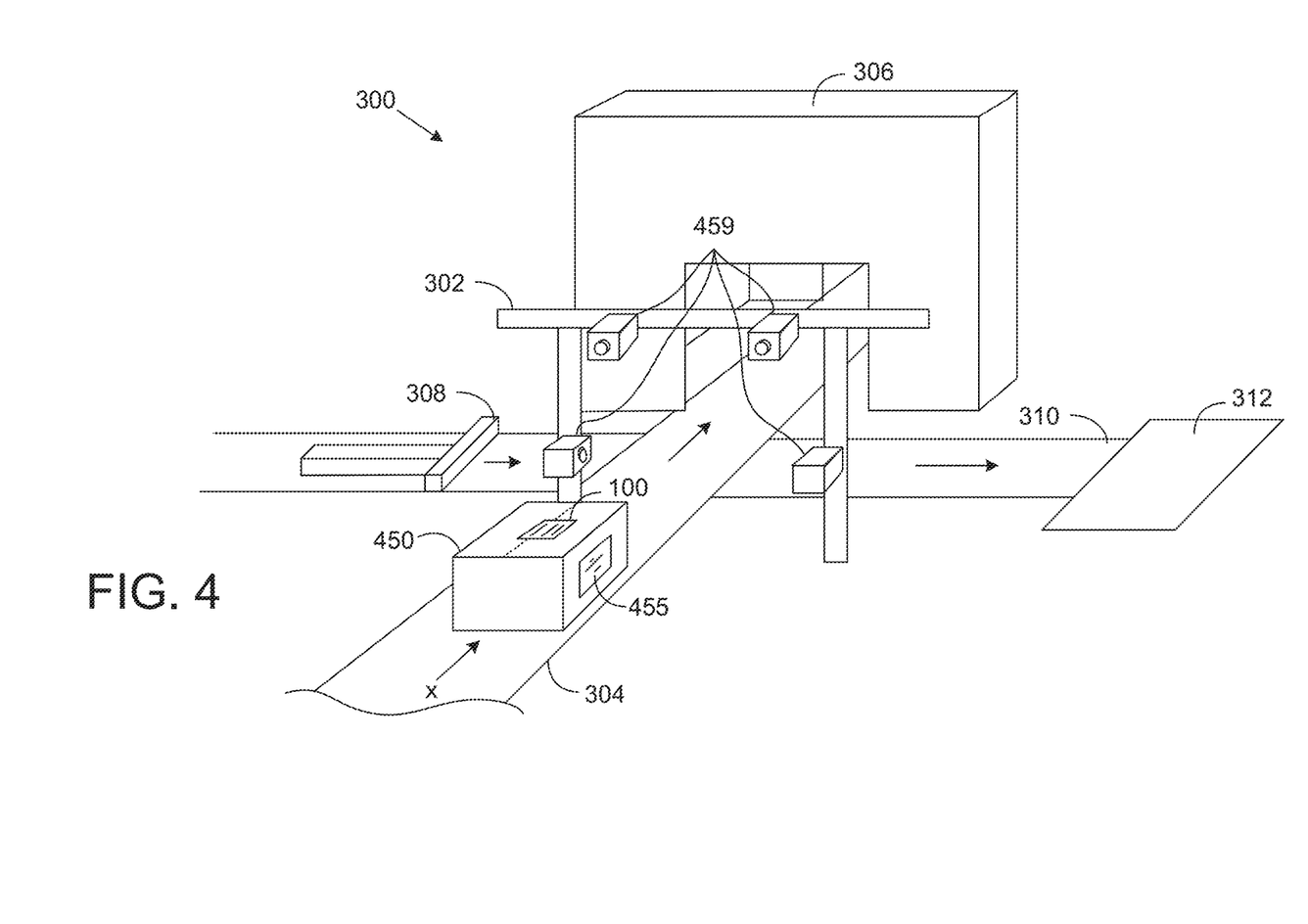
FIG. 4 is a drawing of a conveyor system incorporating a label inspection station according to embodiments of the disclosure.

Referring next to FIG. 4, shown is alternative view of a portion of a conveyor system 300 according to one embodiment of the disclosure. As in the example shown in FIG. 3, the conveyor system 300 can be deployed in a fulfillment center from which parcels are shipped. Parcels can be loaded with items in the fulfillment center, labels can be applied to parcels, where necessary, and the parcels can be shipped from the fulfillment center. In one embodiment, the conveyor system 300 can facilitate shipment of parcels from the fulfillment center by automating some of the tasks involved in shipping the parcel to its final destination.

In the example of FIG. 4, a parcel 450 is provided to the conveyor system 300. In the example of FIG. 4, the parcel 450 has been loaded with items and a label 100 has been applied to the parcel 450. Additionally, a parcel identifier label 455 that has a parcel identifier uniquely identifying the parcel with respect to other parcels has also been applied to the parcel 450. In one example, a worker can load the parcel 450 with items from a warehouse or storage area of the fulfillment center, apply the parcel identifier label 455, and also apply the label 100 if the items loaded into the parcel 450 require one.

The label 100 is shown applied to a top surface of parcel 100. However, in some examples, the label 100 can be applied to a side surface of the parcel 450. In some jurisdictions, the label 100 can be applied to the bottom surface of the parcel 450. In this scenario, the label inspection station 302 and conveyor belt 304 can be modified to allow for visibility of the bottom surface of the parcel 450 at the label inspection station 302 in order to inspect the bottom surface in the event that the label 100 was placed on the bottom surface.

Additionally, the conveyor system 300 may include other stations that provide other functionality before or after the label inspection station 302. For example, a weighing station where the parcel 450 is weighed can be provided. The weight can be taken into account for the purposes of calculating postage or a shipping rate for the parcel 450. In some examples, the label 100 can be printed and/or applied by an automated station where the parcel identifier is detected and the label 100 applied by a robotic device if the parcel identifier is associated with one or more items requiring the label 100. In some embodiments, the parcel 450 can be loaded with items by robotic devices as well.

Accordingly, as shown in FIG. 4, the parcel 450 can be provided to the conveyor system 300, which can advance the parcel 450 to the label inspection station 302. The label inspection station 302 can be equipped with one or more optical scanners 459, which can be implemented as cameras and/or barcode scanners. The optical scanners 459 are positioned around the conveyor belt 304 such that five sides (e.g., excluding a bottom side) of the parcel 450 can be examined by the optical scanners 459 as the parcel 450 moves through the label inspection station 302. The optical scanners 459 can identify the parcel identifier label 455 and extract a parcel identifier. The label inspection station 302, or a system orchestrating movement of the parcel 450 through the conveyor system 300, can identify a record in a data store that corresponds to the parcel identifier. The label inspection station 302 or the system orchestrating the conveyor system 300 can then determine whether the record corresponding to the parcel identifier specifies a label 100 that must be applied to the parcel 450 before the parcel 450 is shipped. In one embodiment, a reference data record can be defined that specifies the form of the label 100 as well as the positioning of the barcodes that abut the barrier 102.

The reference data record can also specify how many and which barcodes should be positioned around the barrier 102 of the label 100 that must be applied to the parcel 450. The reference data record can specify a value embedded in each of the barcodes abutting the barrier 102 as well. In some embodiments, the data record corresponding to the parcel identifier can specify the values embedded in each of the barcodes abutting the barrier 102 in the event that unique barcodes are employed for each label 100 applied to a parcel 450.

If a label 100 is required for the parcel 450 based upon its contents, the optical scanners 459 can attempt to identify or scan one or more barcodes bordering the barrier 102 on the label 100. As noted above, the barcodes and the values embedded therein can be defined in a reference data record associated with the label 100 that is used for all variants of the label 100 applied to parcels 450 or by a data record corresponding to the parcel 450 that specifies unique barcodes that should be present within a unique label 100 generated for the parcel 450. In some embodiments, the barcodes within a label 100 can be unique with respect to one another but not globally unique.

If the optical scanners 459 successfully identify every barcode on the label 100, the parcel 450 can be advanced by the label inspection station 302 or a system orchestrating the conveyor system 300 to the next station in a shipping workflow. For example, the parcel 450 can be advanced to the shipping label applicator 306 where a shipping label can be applied, to a weighing station where the parcel is weighed, or to a carrier drop-off station where the parcel is handed off to a shipping carrier.

If one or more of the barcodes on the label 100 are not successfully scanned or detected by the optical scanners 459, the label inspection station 302 or a system orchestrating the conveyor system 300 can sideline the parcel 450 using a sidelining device 308 and sidelining conveyor 310 to an exception station 312, where the parcel 450 can be inspected by a worker. The sidelining device 308 can extend onto the conveyor belt 304 as the parcel 450 passes the in front of the device such that it physically pushes the parcel onto the sidelining conveyor 310, which moves the parcel to the exception station 312. At the exception station 312, the label 100 required for the parcel 450 can be inspected or reapplied to the parcel 450. The parcel 450 can then be provided to the label inspection station 302 via the conveyor system 300 for another inspection of the label 100.

Figure 5:
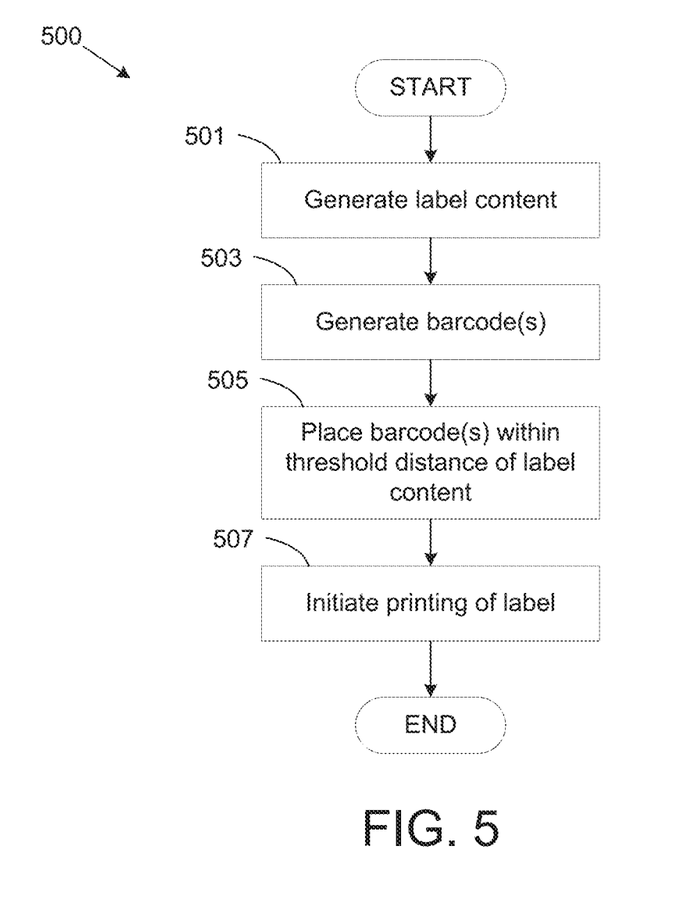
FIGS. 5-6 are flowcharts illustrating example methods according to various embodiments of the present disclosure.

Referring next to FIG. 5, shown is a flowchart that provides one example method 500 of generating a label 100 according to various embodiments of the disclosure. The method 500 can be executed by a computing device or computing environment that generates labels 100 that can be affixed to parcels that require them based upon their contents. In one scenario, the data that defines how the label 100 should appear can be defined in a reference data record associated with the label 100. The data defining how the label should appear can include one or more reference images according to how regulatory requirements define the required elements of the label 100. The data can also define how many and where the barcodes abutting the barrier 102 should be placed.

Beginning with box 501, the label content (e.g., a barrier 102 and label informational content 104) can be generated. As noted above, the label content can include a barrier 102 that is a hashed line barrier or any other form of barrier that is defined by regulatory requirements that define how the label 100 must appear. The informational content 104 can also be generated, which must be placed within the barrier 102 according to the appropriate regulatory requirements. However, in some examples, the label content can simply include informational content 104. At box 503, one or more barcodes that will abut or be placed adjacent to the various sides of the label content can be generated. At step 505, the barcodes can be placed along the respective borders of the label content or within a threshold distance of the label content. For examples, the barcodes can be placed along the periphery or edges of the label content. In other examples, the barcodes can be placed within the informational content 104, such as within a barrier 102 of the label. At box 507, printing of the label 100 can be initiated.

Figure 6:
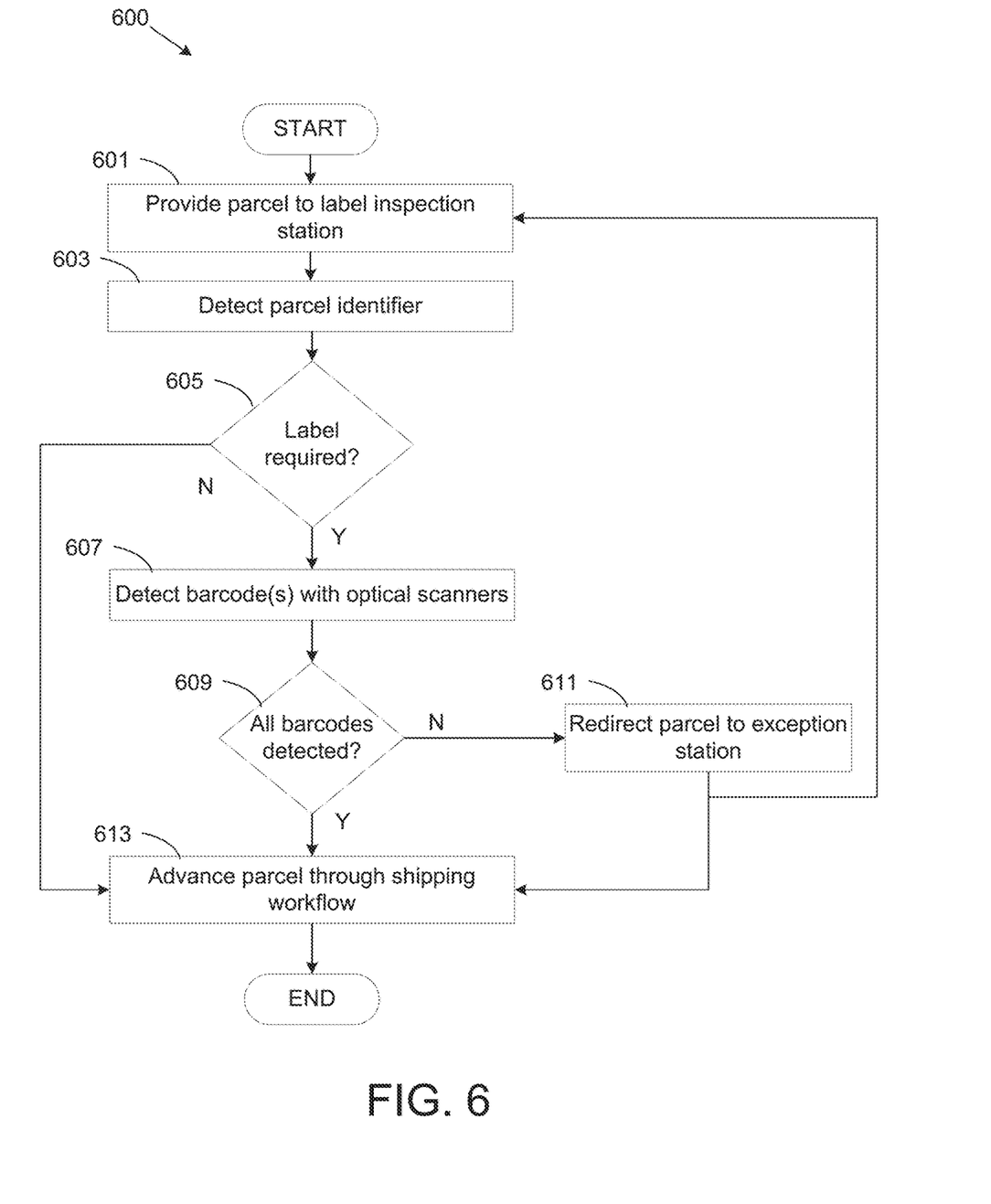

Referring next to FIG. 6, shown is a flowchart that provides one example method 600 of inspecting a label 100 at a label inspection station 302 according to various embodiments of the disclosure. The method 600 shown in FIG. 6 can be executed or implemented in one or more computing devices or a computing environment that orchestrates the operation of a conveyor system 300 and its various stations or components. The method 600 can also be executed or implemented by a computing device or computing environment that orchestrates the operation of the label inspection station 302.

First, at box 601, the conveyor system 300, or one or more conveyor belts, robotic transport devices, or other mechanisms that move parcels through the system, can provide a parcel to the label inspection station 302. At box 603, the label inspection station 302 can detect a parcel identifier that is affixed to the parcel. As noted above, the parcel identifier can uniquely identify the parcel, and its associated shipment and/or items, with respect to other parcels in the conveyor system 300 or within a fulfillment center in which the conveyor system 300 is deployed.

At box 605, the method 600 can determine whether a label 100 is required for the particular parcel associated with the parcel identifier. If no label 100 is required, the method 600 can proceed to box 613, where the parcel is advanced to a next station or portion of a shipping workflow by the conveyor system 300. If a label 100 is required, the method proceeds to box 607, where the label inspection station 302 attempts to detect the barcodes abutting any label 100 present on the parcel with the optical scanners 459 of the label inspection station 302. At box 609, if all of the barcodes that are expected to be incorporated on the label 100 are detected, the process proceeds to box 613, where the parcel can be advanced to the next station within a shipping workflow by the conveyor system 300.

If all of the barcodes are not detected at box 609, it can be assumed that the label 100 has been damaged, obstructed or is missing. In this scenario, the method 600 proceeds to box 611, where the parcel can be sidelined or redirected by a sidelining device 308 to an exception station 312 for further inspection or remediation of a missing, damaged or obstructed label 100. Following inspection or remediation of the label 100 at the exception station 312, the parcel can again be routed to the label inspection station 302 at box 601, and the method 600 of inspecting the label 100 can proceed as described above. Alternatively, following inspection or remediation of the label 100 at the exception station 312, the parcel can be manually inspected and advanced to the next station or portion of a shipping workflow at box 613.

The flowcharts of FIGS. 5-6 show the functionality and operation of an implementation of portions of the label inspection station 302 or conveyor system 300. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a computer system or other system. The machine code may be converted from the source code, etc. If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
obtaining a parcel identifier of a first label affixed to a particular parcel from at least one optical scanner, the parcel identifier uniquely identifying the particular parcel with respect to other parcels;
identifying an electronic record associated with the parcel identifier;
determining that a second label with at least two barcodes is required to be affixed to the particular parcel based at least in part on an identification of an item type of at least one item within the particular parcel, the at least one item being determined from the electronic record of the particular parcel, the second label comprising label content;
in response to determining that the electronic record identifies the at least one item associated with the second label, initiating optical scanning of a plurality of sides of the particular parcel by the at least one optical scanner;
determining that the at least one optical scanner fails to detect a particular barcode of the at least two barcodes positioned along respective borders of the label content, wherein the at least two barcodes each have a unique identifier that is different from each other, the at least two barcodes are each associated with a unique location along a respective border, and the failure to detect the particular barcode represents an indication for the unique location of the particular barcode of at least one of an obstructed label portion, a damaged label portion, or a missing label portion; and
in response to determining that the at least one optical scanner fails to detect the particular barcode, sidelining the particular parcel for additional inspection.

2. The method of claim 1, wherein the at least two barcodes are positioned on opposing sides of the label content.

3. The method of claim 1, wherein sidelining the particular parcel for the additional inspection further comprises initiating printing of the second label by a label printer.

4. The method of claim 1, wherein the at least two barcodes are placed within the second label.

5. A conveyor system, comprising:
   at least one conveyor; and
   a label inspection station coupled to the at least one conveyor, wherein the label inspection station is configured to:
      receive a parcel via the at least one conveyor;
      identify a parcel identifier from a first label on an exterior of the parcel;
      determine that a second label with a plurality of barcodes is required to be affixed to the parcel based at least in part on identifying an item type of at least one item included within the parcel, the at least one item being associated with the parcel identifier;
      initiate detection of the plurality of barcodes associated with the second label, wherein the plurality of barcodes have a unique identifier that is different from each other, and the plurality of barcodes are each associated with a unique location along a respective border of the second label; and
      upon a failure to detect at least one of the plurality of barcodes, generate an exception associated with the parcel, wherein the failure to detect the at least one of the plurality of barcodes represents an indication for the unique location of at least one of an obstructed label portion, a damaged label portion, or a missing label portion.

6. The conveyor system of claim 5, wherein the plurality of barcodes comprises a first barcode and a second barcode, wherein the first barcode is positioned along a top border of a barrier associated with the second label, and the second barcode is positioned along a bottom border of the barrier.

7. The conveyor system of claim 6, wherein the plurality of barcodes comprises a third barcode and a fourth barcode, wherein the third barcode is positioned along a side border of the barrier and the fourth barcode is positioned along an opposing side border of the barrier.

8. The conveyor system of claim 6, wherein the barrier comprises a rectangular barrier.

9. The conveyor system of claim 5, wherein the label inspection station is further configured to at least advance the parcel to a subsequent station in a shipping workflow in response to successful detection of the plurality of barcodes associated with the second label.

10. The conveyor system of claim 5, wherein the label inspection station further comprises a plurality of optical scanners configured to detect the plurality of barcodes associated with the second label.

11. The conveyor system of claim 5, wherein the label inspection station is configured to determine the unique location of the at least one of the plurality of barcodes that was not detected, wherein the unique location represents a portion of the respective border of the second label.

* * * * *